United States Patent [19]
Tarter

[11] 3,828,875
[45] Aug. 13, 1974

[54] HYDRAULIC CONTROL APPARATUS FOR A MOBILE SLURRY HANDLING SYSTEM

[75] Inventor: James H. Tarter, Royal Oak, Mich.

[73] Assignee: Continental Oil Company, Ponca City, Okla.

[22] Filed: Dec. 29, 1972

[21] Appl. No.: 319,828

[52] U.S. Cl................ 180/14 A, 60/97 SE, 60/420, 91/412, 180/6.48, 180/66 R, 299/64
[51] Int. Cl............................................. B62d 59/00
[58] Field of Search..... 180/14 R, 14 A, 6.48, 66 R, 180/14 D; 60/97 SE, 420; 91/412; 299/64

[56] References Cited
UNITED STATES PATENTS

| | | | |
|---|---|---|---|
| 3,260,548 | 7/1966 | Reichl | 299/18 |
| 3,424,260 | 1/1969 | Stone et al. | 180/66 R |
| 3,506,081 | 4/1970 | Rumsey | 180/66 R X |
| 3,612,202 | 10/1971 | Moon et al. | 180/14 A |
| 3,672,167 | 6/1972 | Griesenbrock | 180/66 R X |

FOREIGN PATENTS OR APPLICATIONS

| | | | |
|---|---|---|---|
| 1,404,537 | 5/1965 | France | 180/6.48 |

Primary Examiner—Robert J. Spar
Assistant Examiner—Leslie J. Paperner
Attorney, Agent, or Firm—William J. Miller

[57] ABSTRACT

A hydraulic control apparatus for a slurry hose transportation system consisting of one or more powered carts and one or more unpowered carts where the powered carts include a propulsion system such as wheels which are driven by hydraulic motors. An electric motor provides power for a hydraulic pump which is coupled through a first system to one set of hydraulic motor ports and through a second system to the second set of hydraulic motor ports. Each of the first and second systems includes a check valve and a flow sensing valve parallelly coupled therein. The hydraulic pump can pass hydraulic fluid under pressure through either the first or the second system, causing the motors to rotate in one direction or the other. A hydraulically operated piston may also be coupled across the flow sensing valve so that, when the pressure increases on the flow sensing valve, the piston will move, transferring a mechanical output to a second powered cart, commanding the second powered cart to follow in the same direction as the first-mentioned powered cart.

3 Claims, 6 Drawing Figures

DIRECTION OF
VALVE OPENING

HYDRAULIC CONTROL APPARATUS FOR A MOBILE SLURRY HANDLING SYSTEM

BRIEF DESCRIPTION OF THE INVENTION

This invention relates to a method for controlling both the rotational direction and power being applied to a propulsion means such as a wheel. A hydraulic control is coupled to the propulsion means and provides the power necessary to operate the propulsion means in either direction and in a linear fashion. A novel flow sensing valve converts the variation in pressure from a nonlinear flow input to a linear pressure output to a control cylinder to provide linear speed control to subsequent carts.

DISCUSSION OF THE PRIOR ART

The best prior art relating to the background where the system is used is found in a U.S. Pat. No. 3,260,548, entitled "Method and Apparatus for Continuously Mining and Transporting Coal" by E. H. Reichl. In the patent a coal digging machine is connected to a terminal through a pair of flexible pipes. These flexible pipes are nonsupported but have a slightly greater length than needed to go from the termination of the fixed pipes to the coal digging machine. Thus some storage is provided by the excessive length of the hose. The invention thus disclosed, however, does not take into consideration the excessive wear which will result from hoses which are made principally of steel reinforced rubber. These hoses may weigh as much as 100 pounds per foot when full, and movement of a hose of this weight over the rough surface of a mine passage floor will result in early failure of the hose. Furthermore, when the mining machine makes a 90° turn, there is no way to successfully move the hose around the turn.

Hydraulic drive systems for vehicles are basically old in the art where a pump is powered by a prime mover which may be electric, gasoline, or diesel. Valves associated with the pump outlet can provide flow control of the hydraulic fluid through any series of conduits in accordance with the desires of the user. Hydraulic motors are often coupled to the output of the valve and connected in a manner so that these hydraulic motors can be driven in either direction. It is important that linear movement of the valve causes a corresponding linear response in the output of the propulsion system. This patent application incorporates a novel flow sensor valve which converts a nonlinear hydraulic flow through a valve to a linear pressure differential to a piston used to transmit speed control information to a subsequent cart.

GENERAL DESCRIPTION OF THE INVENTION

The same numbers will be used throughout the specification for the same or similar parts.

Figure 1:
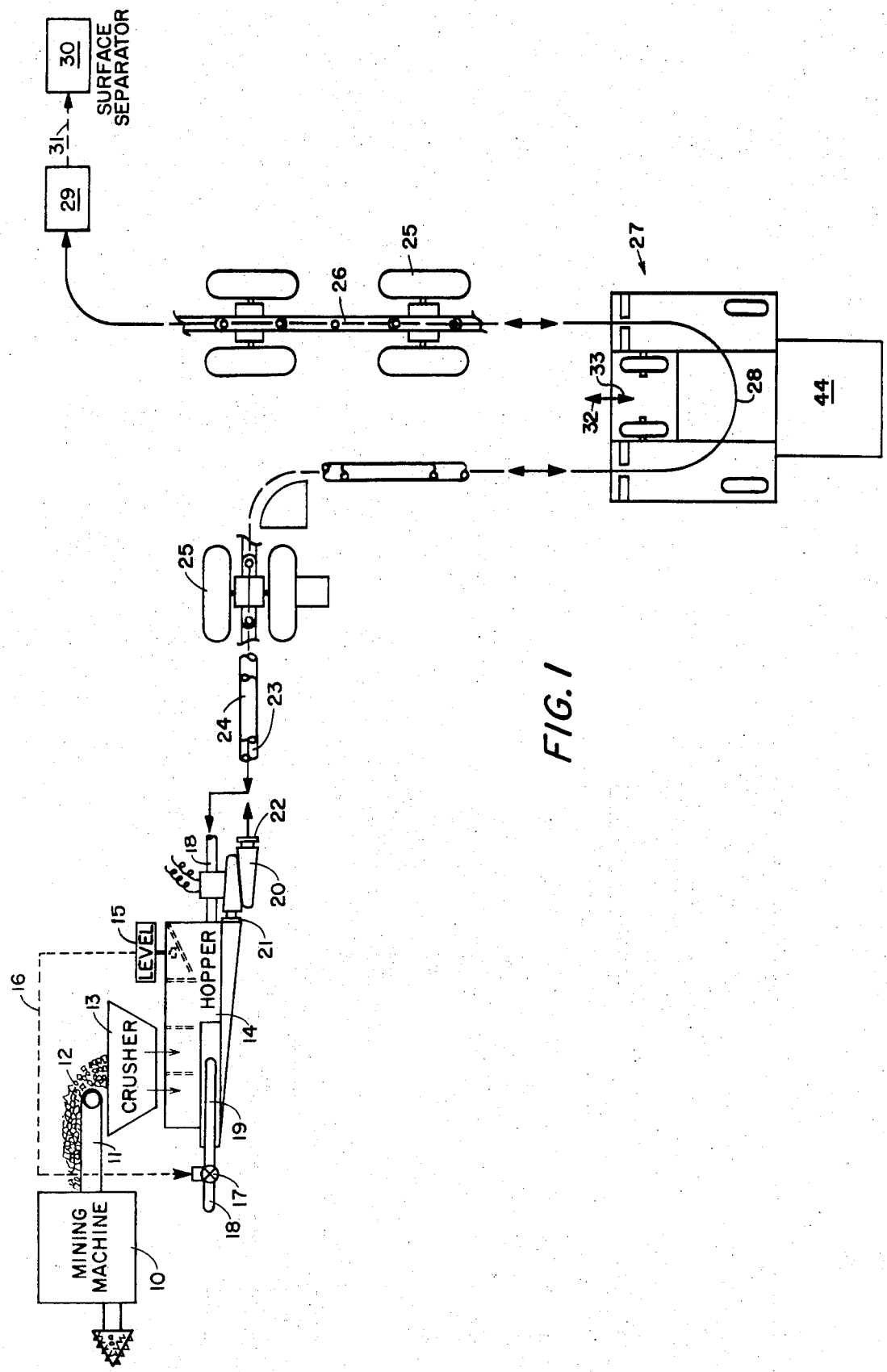
FIG. 1 is a schematic layout of the hose hauling system and its interconnection with the powered carts and with the digging machine utilizing the hydraulic drive of this invention.

Referring to all of the drawings but in particular to FIG. 1, a mine digging machine 10 has the product loosened by machine 10 and picked up by a conveyer 11. The product 12 is dropped into a crusher 13, which may be any usual type crusher such as a roll crusher or jaw crusher, and may include means for separating the material that does not need to be crushed and crushing only the larger material. Crushers are well known and will not be further discussed. The material from the crusher is dropped into a hopper 14 which contains water. A water level control 15 applies a continuous signal through line 16 to a valve 17 which is connected to a water line 18. Water line 19 is connected to valve 17 and through a plurality of slots (not shown) communicating with the interior of the hopper. The hopper illustrated herein is for the purposes of assisting in the understanding of the invention and is the subject matter of a patent application entitled "Slurry Hopper System", Ser. No. 389,272, filed Aug. 21, 1973 and is copending with this application.

A slurry pump 20 has its inlet connected to the outlet 21 of hopper 14. Slurry pump 20 has an outlet 22 connected to a slurry hose 23. Hose 24 is connected to water line 18. Both hoses 23 and 24 are supported upon a slurry transportation system which essentially comprises a plurality of carts 25 connected by linkage 26. A conveyer 27 controls the movement of the carts, linkage and pipe assembly around 180° turn 28. The termination of the water hose 24 and water hose 23 is at a remote terminal 29. A surface separator 30 may be connected to remote terminal 29 through any well known system 31 such as a pipe line.

The operation of the overall system functions as follows:

As the mining machine 10 removes product 12, it is carried up by conveyer 11 and passed to crusher 13 where it is deposited in hopper 14. Pump 20 pulls the slurry mixture from the hopper and passes it into line 23 where it is eventually received at a remote terminal 29, pumped to the surface through pipe line 31, and separated by separator 30. As mining machine 10 works in and out of the coal seam, the slurry hose must follow these movements. Cart 25, through a servo mechanism, will follow the in and out movements of the mining machine. A portion of the slurry line between the conveyer 27 and the remote terminal 29 functions as a storage. Thus as additional length of hose is needed, conveyer 27 will move in the direction of arrow 32, shortening the amount in storage and lengthening the amount of slurry hose which can penetrate the mine room with the mining machine. In order to accomplish the above, however, conveyer 27 must move the carts 25, including the slurry hose supported by it, from the position in storage to a position where it can be utilized by the mining machine. Conveyer 27 accomplishes the transition from storage to active use by lifting the carts upon the conveyer surface and moving the carts through 180°. The conveyer will move in the direction of arrow 33 when additional storage is needed or in the direction of arrow 32 when less storage is needed. The conveyer further restricts the hose to a definite radius, thereby preventing excess flexing or bending.

ELECTRICAL CONTROL

Figure 2:
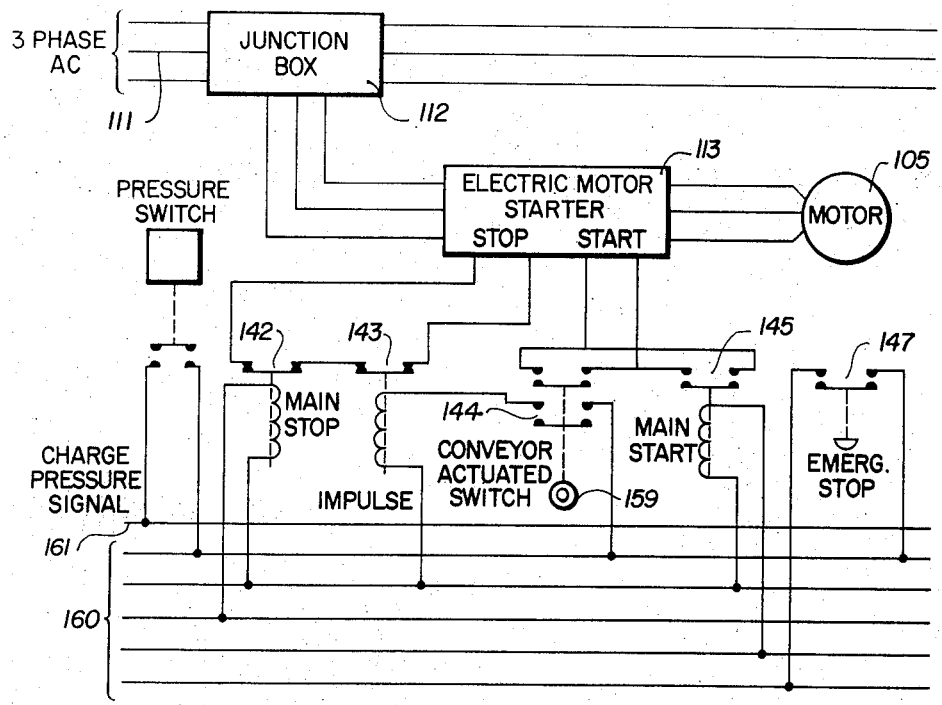
FIG. 2 is the electrical schematic used to operate the prime mover which provides power to the prime pump used in the hydraulic system of this invention.

The electrical control for the prime hydraulic pump 104 is illustrated in FIG. 2. The electrical components are, in the preferred embodiments of this invention, distributed among two vehicles with a junction box 112, a motor starter 113, and relays 142, 143, and 145 mounted on an unpowered vehicle (not shown) in an explosion-proof box. A pressure switch 146, a conveyer switch 144, and emergency stop 147 are mounted on the powered vehicle 80. A three-phase a.c. line 111, which may, for example, be 575 volts is used to operate electric motors 105 and is transmitted along the hose line in electric cables 150.

The operation of the above is as follows:

Starter 113 is energized by closing a relay 145 across its starter terminals. It is stopped by opening a set of normally closed contacts 142 across its stop terminals. A stop signal will override a conflicting start signal. Primary control of the starter 141 is by means of two relays, a normally closed relay 142 associated with the stop terminal and a normally open relay 145 across the start terminals. These relays are controlled from one or both ends of the hose lines. At this time it is presumed that primary electric control will be from the fixed end of the hose line, but the system accommodates control from the pump vehicle end also. Actuation of a switch at the control end of the hose line will actuate all start relays 145 or all stop relays 142 simultaneously. This will start or stop all hose line electric motors except those on the stationary side of the loop.

Vehicles on the stationary side of the loop are parked, and it is not desired that the electric motor on these vehicles be started until they pass over the traveling conveyer 27. A limit switch 159 is mounted on each powered vehicle which is actuated when the vehicle passes over the central part of the conveyer. This switch, which is normally open, has a dual set of contacts. One set of contacts is placed across the start terminal of the starter. The other set of contacts is used to control an impulse relay 143 placed in series with the main stop relay 142. An impulse relay is a mechanically latching relay whose contacts open and close on alternate actuation pulses; that is, if the impulse relay contacts are closed and the voltage is applied to its coil, the contacts open. The next time a voltage is applied to the coil, the contacts again close. Since latching is mechanical, the impulse relay stays in the condition to which it was last actuated even though all electric power is turned off. This enables a powered vehicle to remember which side of the conveyer it is on. When the vehicle is on the parked side of the loop and travels over the conveyer, the conveyer operated switch 159 closes the impulse relay and a start signal is applied to the starter. On coming back, the impulse relay is actuated and its contacts open, shutting off the motor.

The emergency stop switch 147, installed on all powered vehicles and possibly on all idler vehicles, will be a normally closed switch, which when manually actuated will send a signal back to the main control station which can be used to shut down all electric power to the hauler vehicle system. The emergency stop switch could also be hooked up to shut down all electric power to the working face. With this switch an individual anywhere along the line may shut down the whole system if difficulty develops.

A pressure switch 146 will be installed on the charge pump of each hydrostatic transmission. This pressure switch, which is normally open, closes when the charge pump pressure is at the nominal value. This pressure switch transmits a voltage signal back to the main control system which can be used to light a panel lamp which will give the operator visual indication of the status of the system. He will thus have a primary indication that a vehicle is functional and will also have an indication of the location of the traveling conveyer.

Control of the electric motors will require five lines 160 running the length of the system. An additional line 161 running the length of the system for each pressure switch will also be required.

HYDRAULIC PUMP CONTROL

Figure 3:
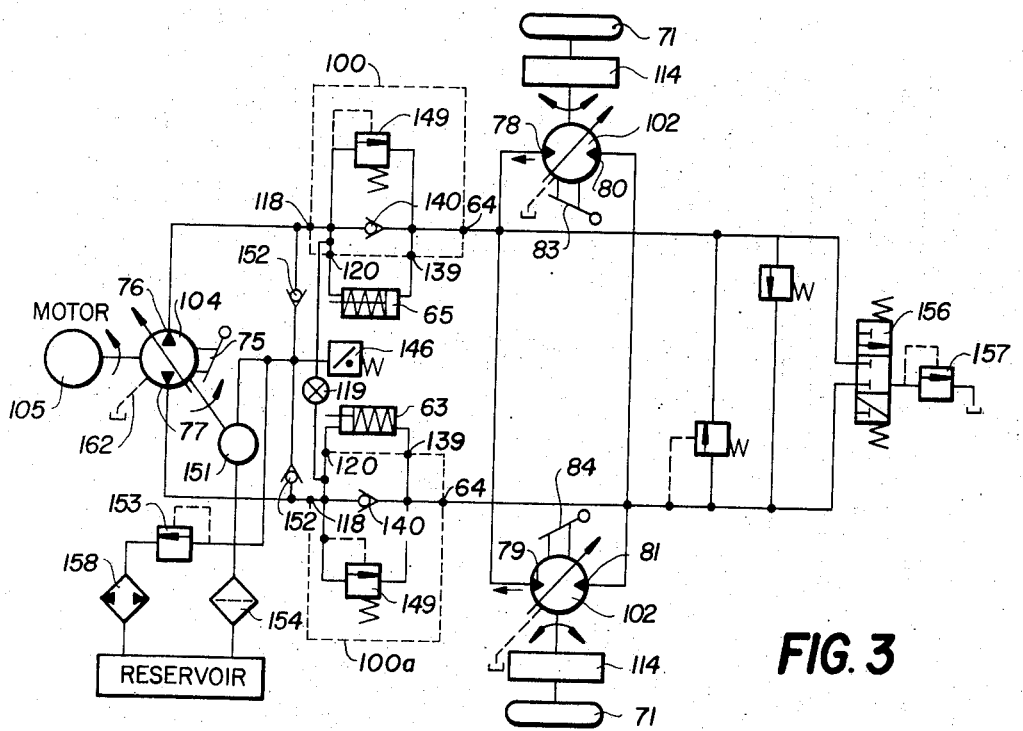
FIG. 3 is a hydraulic schematic of a powered cart.
Figure 4:
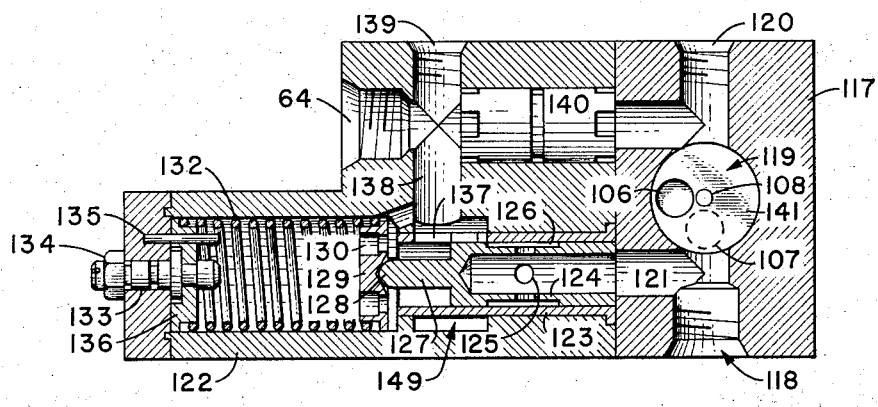
FIG. 4 is a cross-sectional view of the pressure responsive control valve.
Figure 5:
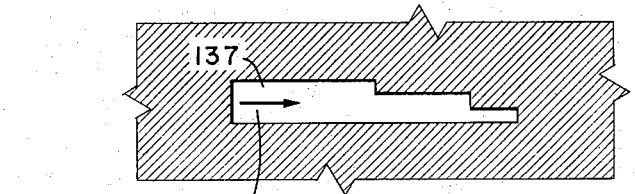
FIG. 5 is an enlarged view of a hydraulic orifice utilized in the valve illustrated in FIG. 4.

Referring to FIGS. 3–5 the hydraulic pump control system is described.

FIG. 3 shows the schematic of the power train. The wheels in the schematic are driven through a transmission 114 by the variable displacement motors 102. The hydraulic motors are supplied by a variable displacement pump 104. The pump is driven by electric motor 105. A charge pump 151 is mounted on the same shaft with the variable displacement pump 104 and supplies the makeup flow required in the closed-loop circuit between the hydraulic motors and pump. Check valves 152 are used to isolate the charge pump output from the high pressure side of the pump-motor circuit. The relief valve 153 is used to dump the excess charge pump flow from the loop when the hydrostatic transmission is in neutral. A pressure switch 146 is used for remote monitoring of the charge pump output pressure, producing an electric signal which lights a pilot lamp at the fixed end of the hose line and gives the operator at this location an indication of those vehicles which are powered. The charge pump is supplied from the reservoir through filter 154.

The vehicle control system requires a signal which is a measure of the hydrostatic transmission flow which is indicative of powered vehicle speed. This signal is obtained by a flow sensor 149 which is functionally equivalent to a relief valve with a very low setting or a check valve. The pressure drop across flow sensor 149 is a function of flow. The pressure drop across flow sensor 149 is applied to control cylinders 63 and 65. Check valves 140 are used to permit return flow in the hydrostatic transmission loop without forcing reverse flow through sensor 149.

If flow is allowed to circulate in the hydrostatic transmission loop indefinitely, excess heating of the oil and components will result. Hence, fresh oil must be supplied to the loop. A shuttle valve 156, actuated by the pressure differential across the hydrostatic transmission, is used to connect the motor input side of the loop to a relief valve 157. Hence, when the hydrostatic transmission is operating, excess charge pump flow is returned to the reservoir through relief valve 157. Thus fluid is continually removed from the hydrostatic transmission loop and is continually replaced by fresh fluid from the charge pump 151. Fluid is returned to the reservoir through a pump shaft mounted air-cooled oil heat exchanger 158 which removes excess heat from the system.

OPERATION

A linear movement of pump displacement control arm 75 in one direction will cause the hydraulic fluid to circulate around the loop in the direction of arrow 76. For example, hydraulic fluid will circulate through the junction containing check valve 140, flow sensor valve 149, and hydraulically actuated piston 65. As the flow increases, the pressure builds up, causing flow sensing valve 149 to open, permitting the flow of fluid to ports 78 and 79 of motors 102. The hydraulic fluid will then flow out of ports 80 and 81, through check valve 140 and back to pump 104. If pump displacement control arm 75 is moved in the opposite direction, the hydraulic fluid will circulate in the direction of arrow 77, through the junction containing flow sensor valve 149, check valve 140, and hydraulically actuated piston 63. When flow sensor valve 149 opens, hydraulic fluid will be passed to ports 81 and 80 of hydraulic motors 102 and out of ports 79 and 78, back to check valve 140 and into pump 104. Thus the motor can have the hydraulic fluid passing in either direction, depending upon the direction of movement of arm 75. Flow sensor valve 149, which will be described in detail in a subsequent portion of the specification, provides a linear output pressure differential in response to a given flow. The linear output pressure differential is applied to the control cylinders 63 or 65 which provide a control signal to the next powered vehicle by means of a mechanical control cable. The magnitude of movement of arm 75 defines the magnitude of the pump flow.

Hydraulic motors 102 may be individually controlled by levers 83 or 84 which vary their displacement in a manner analogous to the manner in which control arm 75 controls the displacement of pump 104; however, the motor controls are not reversible and are not capable of reducing the motor displacement to zero. Levers 83 or 84 may be actuated by some external output, such as, for example, a guide rail, which may strike levers 83 or 84, indicating to the vehicle that it is deviating from a given path. Movement of levers 83 or 84 causes a reduction in the torque output of wheels 71 by reducing the displacement of motors 102. This reduction in wheel torque steers the vehicle in one direction or the other.

FLOW SENSOR VALVE

Figure 6:
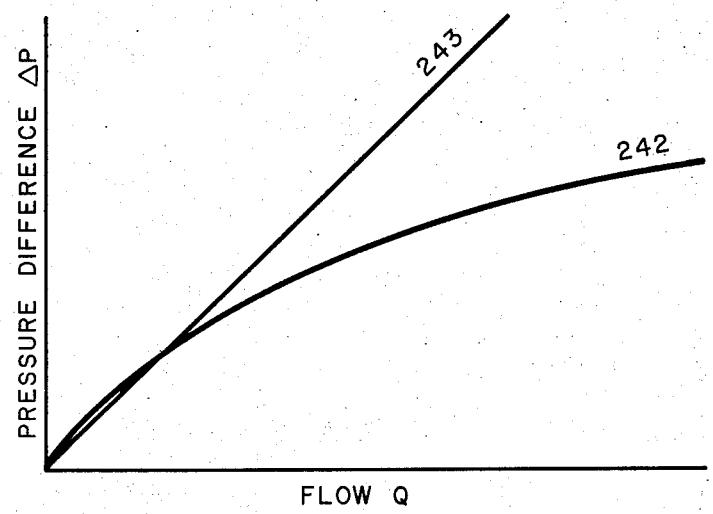
FIG. 6 is a graph of the change in pressure versus area for the orifice illustrated in FIG. 5.

The flow sensor valve utilized in FIG. 3 is more clearly illustrated in FIGS. 4, 5, and 6 and essentially comprises an inlet housing 117 having an inlet port 118, a function or by-pass valve 119, a first outlet pressure port 120, and a port 121 which is coupled to inlet port 118. Valve 119 includes a shaft 108 mechanically coupled to a valve disc closure 141 having an orifice 106 therethrough. Referring to FIG. 3, it is noted that two valve assemblies 100 and 100a are illustrated. In FIG. 4 a single valve assembly 100 is drawn; however, the unit is actually constructed by mounting valve assemblies 100 and 100a back-to-back. Orifice 107 communicates with the corresponding inlet 118 in valve assembly 100a; therefore, if valve disc 141 is rotated by turning shaft 108 to align orifice 106 with 107, a passage will be opened between the two inlets 118 of valve assemblies 100 and 100a. Valve assembly 100a was not illustrated because it is identical to valve assembly 100. A second valve housing 122 contains flow sensor valve 149 which comprises a valve cylinder 123 having a sliding valve 124 therein. Sliding valve 124 has a plurality of circular ports 125 which opens to circumferential recess 126. An end portion 127 is closed and has tip 128 connected to a spring retainer 129. Ports 130 permit free passage of oil behind spring retainer 129. A spring 132 provides a balancing force for spring retainer 129. A spring adjusting means includes a screw 133, a nut 134, pin 135 and pressure plate 136. A specially cut port 137, which will be described later, communicates with outlet port 138. A pair of outlet ports 139 and 64 is connected to port 137. A check valve 140 is coupled between ports 139, 64 and 118 and will permit flow from port 64 to port 118 but will not permit flow in the reverse direction without passing through flow sensing valve 149.

OPERATION

The operation of valve assembly 100 or 100a is as follows:

Hydraulic fluid entering inlet 118 will pass through port 121 and to the interior of sliding valve 124. The pressure will be applied to the end of the valve 124, forcing valve 124 in the direction of spring 132, compressing the spring. As the spring is compressed, hydraulic fluid will pass into circular port 125 and into circumferential recess 126. As the circumferential recess passes into the opening of special port 137, hydraulic fluid will pass through port 138 to outlet port 64. The pressure caused by spring 132 against spring retainer 129 can be varied by moving pressure plate 136 by a simple adjustment of screw 133. Special port 137, along with the spring bias from spring 132, is designed to linearize the pressure response of the valve. Pump 104 pressure is also applied directly to port 120 and thus to piston 65 or 63.

Referring to FIG. 6 the ordinary response of a hydraulic valve is illustrated by solid line 242. The response from the flow sensor valve follows line 243. In order to make the valve follow such a response, it was discovered that, if the valve could be designed in accordance with the following mathematical relationship, then the valve would have a linear response.

The relationship between the flow Q and the pressure differential P for a hydraulic valve is:

$$Q = KA \sqrt{P}$$

where K is a constant for a given fluid at a given temperature.

If the valve has a metering slot with a constant width $$A = C_1 \Delta P$$

where the constant $C_1$ depends on the width of the metering slot, the diameter of valve 124, and the rate of spring 132, then $Q = KC_1 \Delta P^{3/2}$ as indicated by line 242.

On the other hand, if the metering slot width is made variable so that $$A = C_2 \sqrt{P}$$

where $C_2$ depends on the geometry of the slot, the diameter of valve 124, and the rate of spring 132, then $Q = KC_2 \Delta P$ as indicated by line 243.

In some instances it becomes necessary for the hydraulic unit to free-wheel, for example, if trouble developes in the hydraulic propulsion system or the electrical or control system. To make the unit free-wheeling, valve shaft 108 is rotated, moving orifice 106 over orifice 107 connecting the inlets 118 together. Hydraulic fluid can now flow freely through valve 119 (see FIG. 3), the check valve 140, and the flow sensing valve 149 for either direction of rotation of the wheels 71. (Hydraulic motor 102 will be functioning as a pump when free-wheeling).

CONCLUSIONS

A hydraulic control system has been disclosed and its relationship to a slurry transportation handling system. The hydraulic system provides linear control of the propulsion units and also provides individual control of each of the propulsion units under certain situations. A novel flow sensing valve has also been described and its incorporation in the hydraulic control system. While the metering slot of FIG. 5 has been illustrated as having several fixed widths for practical purposes, it should be understood that the ideal metering slot is a continuous curve which has a function of travel "x" of valve 124. The travel "x" is a linear function of $\Delta P$ with the exact relationship depending on the valve diameter and spring rate.

It is obvious that modifications and changes in the system can be made and still be within the spirit and scope of this invention.

What I claim is:

1. A hydraulic control for a slurry hose transportation system having at least a pair of powered carts each including at least first and second propulsion means, hydraulic motors each having first and second ports coupled to said propulsion means, an elctric motor, a hydraulic pump means having a first and second port coupled to said electric motor and a reservoir for hydraulic fluid comprising first and second means for coupling the first and second ports of said hydraulic pump to the first and second ports of said hydraulic motors respectively, each of said first and second coupling means having parallelly connected therein a check valve and a flow sensing valve which has an inlet port and an outlet port means and wherein said outlet port generates linear pressure outlet which is directly proportional to the change in flow through said outlet port and wherein a hydraulic cylinder includes a spring biased piston therein and a port on each end of said piston which ports are connected across the inlet and outlet ports of said flow sensing valve respectively and a mechanical means connected between said spring biased piston and the hydraulic control on said second cart, whereby a change in flow will move said piston linearly in response thereto to provide a command to the hydraulic control of said second cart.

2. A hydraulic control as described in claim 1 wherein said flow sensing valve comprises a cylinder having a piston therein, wherein said outlet port is exposed by lineal movement of said piston, and a spring pressuring said piston away from said outlet port.

3. A hydraulic control as described in claim 2 wherein said outlet port comprises an elongated opening having its shape described by the formula $Q = KC_2 P$ where $K =$ is a constant for said hydraulic fluid at a given temperature, $C_2 =$ is a constant determined by the geometry of the opening, the diameter of the valve piston and the spring rate, $Q =$ flow through the valve, and $P =$ pressure differential across valve.

* * * * *